US012732792B2

(12) United States Patent
Lee et al.

(10) Patent No.: US 12,732,792 B2
(45) Date of Patent: Sep. 8, 2026

(54) SELECTING SUBSCRIPTION TO RECEIVE POSITIONING SYSTEM INFORMATION BLOCK (SIB) IN A MULTIPLE SUBSCRIPTION WIRELESS DEVICE

(71) Applicant: QUALCOMM Incorporated, San Diego, CA (US)

(72) Inventors: Kuo-Chun Lee, San Diego, CA (US); Qingxin Chen, San Diego, CA (US); Arvind Vardarajan Santhanam, San Diego, CA (US); Reza Shahidi, La Jolla, CA (US); Shanshan Wang, San Diego, CA (US); Liangchi Hsu, San Diego, CA (US); Rishav Rej, San Diego, CA (US); Ie-Hong Lin, Cupertino, CA (US); Karthik Venkatram, San Diego, CA (US); Subashini Krishnamurthy, San Diego, CA (US); Sudeep Jain, Fremont, CA (US); Amit Jain, San Diego, CA (US); Tom Chin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 485 days.

(21) Appl. No.: 18/070,216

(22) Filed: Nov. 28, 2022

(65) Prior Publication Data

US 2024/0179512 A1 May 30, 2024

(51) Int. Cl.
*H04W 8/18* (2009.01)
*H04W 8/02* (2009.01)
(Continued)

(52) U.S. Cl.
CPC ............ *H04W 8/183* (2013.01); *H04W 8/02* (2013.01); *H04W 64/00* (2013.01); *H04W 12/40* (2021.01); *H04W 88/06* (2013.01)

(58) Field of Classification Search
CPC . H04W 12/42; H04W 12/0471; H04W 88/06; H04W 36/0085; H04W 4/02;
(Continued)

(56) References Cited

U.S. PATENT DOCUMENTS 8,688,122 B2 * 4/2014 Mutya ............... H04W 52/0254 455/442
9,826,570 B1 * 11/2017 Gupta ................. H04L 65/1073
(Continued)

FOREIGN PATENT DOCUMENTS

CN 116349403 A * 6/2023 ............ H04W 68/02
CN 118019000 A * 5/2024 ............ H04L 63/20
(Continued)

OTHER PUBLICATIONS

K. Zahoor, K. Bilal, A. Erbad, A. Mohamed and M. Guizani, "Multicast at Edge: An Edge Network Architecture for Service-Less Crowdsourced Live Video Multicast," in IEEE Access, vol. 9, pp. 59508-59526, 2021, doi: 10.1109/ACCESS.2021.3070814 (Year: 2021).*

(Continued)

*Primary Examiner* — William D Cumming
(74) *Attorney, Agent, or Firm* — Seyfarth Shaw LLP

(57) ABSTRACT

A method for of wireless communication, by a multi-subscription user equipment (UE) includes selecting a first subscription to receive a positioning system information broadcast (posSIB) based on a first subscription state and a second subscription state. The method also includes receiving the posSIB via the first subscription. The UE may switch from the first subscription to a second subscription to receive a subsequent posSIB, in response to the second subscription state changing and/or the first subscription state changing.
(Continued)

1200

The state switching may be between connected mode and inactive/idle mode, or between voice service and data service.

30 Claims, 12 Drawing Sheets

(51) Int. Cl.
*H04W 12/40* (2021.01)
*H04W 64/00* (2009.01)
*H04W 88/06* (2009.01)

(58) Field of Classification Search
CPC ............... H04W 48/10; H04W 12/041; H04W 72/1263; H04W 48/18; H04W 52/367; H04W 52/028; H04W 68/02; H04W 64/003; H04W 24/04; H04W 52/0241; H04W 36/30; H04W 72/56; H04W 76/16; H04W 52/0254; H04W 24/10
USPC ............... 455/552.1, 456.1, 422.1, 442, 436; 370/252, 310, 318, 352, 331
See application file for complete search history.

(56) References Cited

U.S. PATENT DOCUMENTS 10,461,950 B2 * 10/2019 Verlaan ............... H04L 65/4015
11,191,056 B2 * 11/2021 Fischer ............... H04W 64/003
11,240,825 B1 * 2/2022 Kumar ................. H04W 72/56
12,200,562 B2 * 1/2025 Kumar ............. H04W 36/0085
12,200,613 B2 * 1/2025 Hebein ................. H04W 48/18
12,273,956 B2 * 4/2025 Cheekatla ............... H04W 8/18
12,328,679 B2 * 6/2025 Kumar ................ H04W 52/367
2011/0217969 A1 * 9/2011 Spartz ................... H04W 76/16 455/422.1
2013/0189985 A1 * 7/2013 Mutya ............... H04W 52/0254 455/436
2015/0119103 A1 * 4/2015 Ngai ..................... H04W 48/18 455/552.1
2015/0139015 A1 * 5/2015 Kadous ............. H04W 36/0085 370/252
2016/0374014 A1 12/2016 Anyuru
2017/0070894 A1 * 3/2017 Kumar ................ H04W 52/028
2017/0230932 A1 * 8/2017 Challa ................... H04W 68/02
2018/0206109 A1 * 7/2018 Bitra ....................... H04W 4/02
2018/0299280 A1 * 10/2018 Kumar ............... G01C 21/3694
2019/0260601 A1 * 8/2019 Verlaan ................... H04L 51/04
2020/0053690 A1 * 2/2020 Fischer ................... G01S 19/05
2021/0050925 A1 * 2/2021 Modarres Razavi ........................ H04W 12/0471
2022/0286994 A1 * 9/2022 Singh ................ H04W 36/1443
2022/0312280 A1 * 9/2022 Xie ................... H04W 36/0085
2023/0011024 A1 * 1/2023 Hebein ............. H04W 52/0241
2023/0049980 A1 * 2/2023 Sharma ............... H04W 12/041
2023/0144714 A1 * 5/2023 Manolakos ........... G01S 5/0236 455/456.1
2023/0199431 A1 * 6/2023 Gune .................... H04W 4/027 455/456.1
2023/0232477 A1 * 7/2023 Kiilerich Pratas .. H04W 60/005 370/310
2023/0239802 A1 * 7/2023 Kumar ................ H04W 52/245 370/318
2023/0319668 A1 * 10/2023 Xie ....................... H04W 36/30 370/331
2023/0337097 A1 * 10/2023 Kumar .............. H04W 52/0245
2023/0370831 A1 * 11/2023 Cheekatla ............... H04W 8/18
2023/0409414 A1 * 12/2023 Mansoor ................. G06F 9/542
2024/0098522 A1 * 3/2024 Kumar .................. H04W 24/10
2024/0179512 A1 * 5/2024 Lee ....................... H04W 48/18
2024/0349033 A1 * 10/2024 Holmes ................. H04W 8/205
2024/0414687 A1 * 12/2024 Aravapalli ............ H04W 48/12
2025/0219820 A1 * 7/2025 Aravapalli ........ H04W 12/0431

FOREIGN PATENT DOCUMENTS

CN 118575530 A * 8/2024 .......... H04W 52/367
CN 120186594 A * 6/2025 .............. H04W 8/24
CN 120226410 A * 6/2025 ............ H04W 64/00
CN 116349403 B * 1/2026 ............ H04W 36/08
EP 3992817 A1 * 5/2022 ......... G06F 16/9535
EP 3992817 B1 * 10/2023 ......... G06F 16/9535
EP 4325379 A1 * 2/2024 ......... G06F 16/9535
JP 2015504291 A * 2/2015 ........ H04W 52/0254
KR 20010034460 A * 4/2001 ............ H04W 8/205
KR 100596830 B1 * 7/2006 ............ H04W 8/205
KR 20230097096 A * 6/2023 ........... H04L 67/562
TW 201729616 A * 8/2017 .......... H04W 68/005
WO WO-2017039956 A1 * 3/2017 .......... H04W 52/028
WO WO-2017136078 A1 * 8/2017 ............ H04W 76/28
WO 2018132226 A1 7/2018
WO WO-2022090354 A1 * 5/2022 ......... G06F 16/9535
WO WO-2022187850 A1 * 9/2022 ........ H04W 28/0846
WO WO-2024118281 A1 * 6/2024 ............ H04W 88/06

OTHER PUBLICATIONS

Huawei., et at., "Discussion on UE Capability for MUSIM", 3GPP TSG-RAN WG2 Meeting #116bis-e, R2-2200921, 3rd Generation Partnership Project, Jan. 17-25, 2022, 10 Pages.
International Search Report and Written Opinion—PCT/US2023/078113—ISA/EPO—Feb. 22, 2024.
Qualcomm Incorporated: "Further Details on Broadcast of Assistance Data", 3GPP TSG-RAN WG2 Meeting #101, R2-1803394, 3rd Generation Partnership Project, Athens, Greece, Feb. 26-Mar. 2, 2018, pp. 1-11.

* cited by examiner

| Case # | SUB1 state, SUB2 state | SUB1 service | SUB2 Service | Selection Rules |
|---|---|---|---|---|
| 1 | Idle/inactive, Idle/inactive | NA | NA | Select DDS SUB to receive posSIB (or continue same SUB) |
| 2 | Connected, Idle/inactive | Voice, or data | NA | Select SUB1, i.e. connected SUB, to receive posSIB |
| 3 | Idle/inactive, Connected | NA | Voice, or data | Select SUB2, i.e. connected SUB, to receive posSIB |
| 4 | Connected, Connected | Voice | Data | Select SUB1, i.e. Voice SUB, to receive posSIB |
| 5 | Connected, Connected | Data | Voice | Select SUB2, i.e. Voice SUB, to receive posSIB |
| 6 | Connected, Connected | Voice | Voice | Select DDS SUB to receive posSIB (or continue same SUB) |
| 7 | Connected, Connected | Data | Data | Select DDS SUB to receive posSIB (or continue same SUB) |

*FIG. 6*

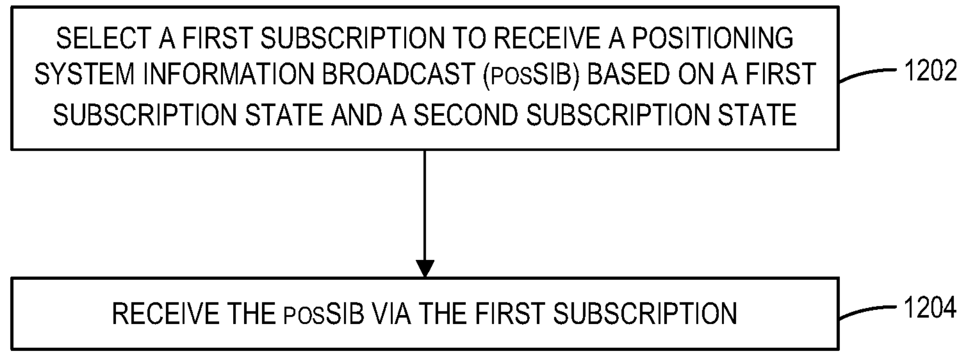
FIG. 12

SELECTING SUBSCRIPTION TO RECEIVE POSITIONING SYSTEM INFORMATION BLOCK (SIB) IN A MULTIPLE SUBSCRIPTION WIRELESS DEVICE

FIELD OF THE DISCLOSURE

The present disclosure relates generally to wireless communications, and more specifically to selecting a subscription for receiving a positioning system information block (SIB) in a user equipment (UE) having multiple subscriptions, such as a multi-subscriber identity module (MSIM) UE.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication, by a multi-subscription user equipment (UE) includes selecting a first subscription to receive a positioning system information broadcast (posSIB) based on a first subscription state and a second subscription state. The method also includes receiving the posSIB via the first subscription.

Other aspects of the present disclosure are directed to an apparatus. The apparatus has a memory and one or more processors coupled to the memory. The processor(s) is configured to select a first subscription to receive a positioning system information broadcast (posSIB) based on a first subscription state and a second subscription state. The processor(s) is also configured to receive the posSIB via the first subscription.

Other aspects of the present disclosure are directed to an apparatus at a user equipment (UE). The apparatus includes means for selecting a first subscription to receive a positioning system information broadcast (posSIB) based on a first subscription state and a second subscription state. The apparatus also includes means for receiving the posSIB via the first subscription.

In other aspects of the present disclosure, a non-transitory computer-readable medium with program code recorded thereon is disclosed. The program code is executed by a processor and includes program code to select a first subscription to receive a positioning system information broadcast (posSIB) based on a first subscription state and a second subscription state. The program code also includes program code to receive the posSIB via the first subscription.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 6 is a table illustrating selection rules for receiving posSIBs, in accordance with aspects of the present disclosure.

FIG. 12 is a flow diagram illustrating an example process performed, for example, by a user equipment (UE), in accordance with various aspects of the present disclosure.

DETAILED DESCRIPTION

Figure 1:
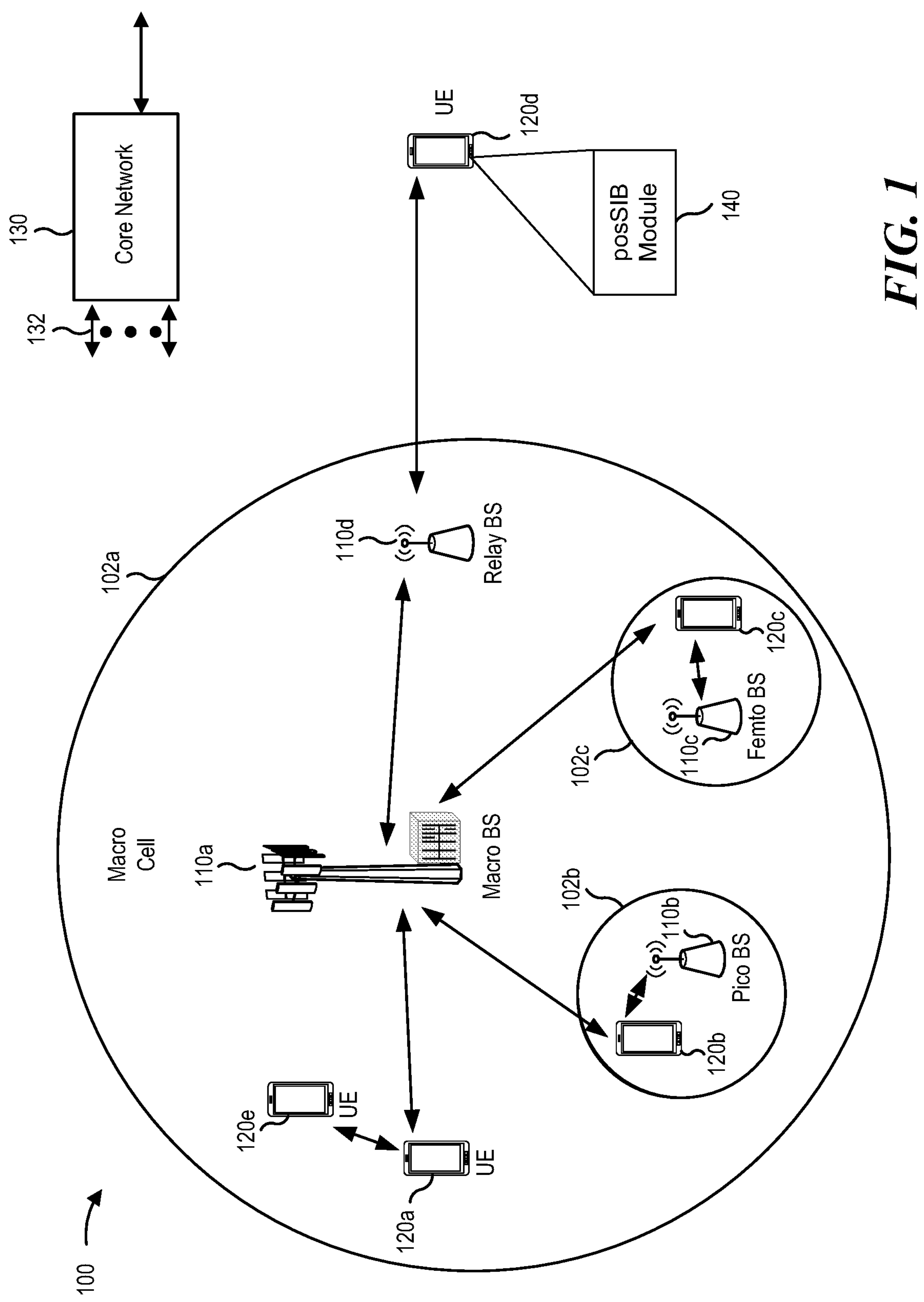
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Third Generation Partnership Project (3GPP) Release 16 defines procedures for a user equipment (UE) to receive a positioning system information block (posSIB) from a new radio (NR) cell. The posSIB may enable very precise location determination using real-time kinematic positioning (RTK), for example. RTK can increase the accuracy of UE location determination from a few meters down to a few centimeters.

When a positioning session is ON, the UE continues to receive broadcast posSIBs for the duration of the session (for example, lasting several minutes to multiple hours) in order to receive updated global navigation satellite system (GNSS) assistance data. The posSIB is sent in a broadcast channel. To allow the posSIB to be received only by eligible devices, the network ciphers the posSIB. The UE needs to receive the ciphering key(s) from the network in order to decipher the posSIB and use its assistance data.

A UE may be a multi-SIM (subscriber identity module) device where there are two SIM cards. Alternatively, the UE may be a single SIM device with multiple subscriptions. It is possible that both subscriptions (SUBs) are camped on or connected to the respective network that broadcasts posSIBs. An issue for the UE is which subscription should be selected to receive the posSIBs.

According to aspects of the present disclosure, the UE selects a subscription to reduce traffic interruption. The UE selects one of the subscriptions to receive posSIBs depending on a state of each subscription, such as what service is running and whether the subscription is in connected mode or idle/inactive mode. In other implementations, the UE remains with an initial subscription for receiving posSIBs, even if the state changes.

According to further aspects of the present disclosure, the UE uses the subscription selected to receive the posSIB in order to request a ciphering key. If two subscriptions belong to the same operator, either subscription can be used to request the ciphering key. According to some aspects, the UE sticks to one subscription for the key request, for example, the initial subscription receiving the posSIBs. The UE, therefore, does not switch subscriptions for a key request, even though the subscription receiving the posSIBs has changed. In these aspects, the UE avoids frequent switching of subscriptions to request keys when the UE switches subscriptions for receiving posSIBs. In other aspects, the UE selects the same subscription to both request the ciphering key and receive the posSIBs.

Aspects of the present disclosure can allow a UE to select one of two subscriptions to receive posSIBs with improved performance in a multiple subscription UE. For example, traffic or position service disruption may be reduced in the multi-subscription UE. The techniques of the present disclosure may also reduce power consumption by using a connected mode subscription to receive posSIBs as opposed to receiving posSIBs during an idle or inactive subscription. Power saving is achieved because when an idle or inactive subscription is to receive posSIBs, the subscription can wake up more often and stay awake for a longer time period each wakeup time due to reception of posSIBs.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110*a*, BS 110*b*, BS 110*c*, and BS 110*d*) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a positioning system information block (posSIB) module 140. For brevity, only one UE 120*d* is shown as including the posSIB module 140. The posSIB module 140 may select a first subscription to receive a positioning system information broadcast (posSIB) based on a first subscription state and a second subscription state. The posSIB module 140 may also receive the posSIB via the first subscription.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
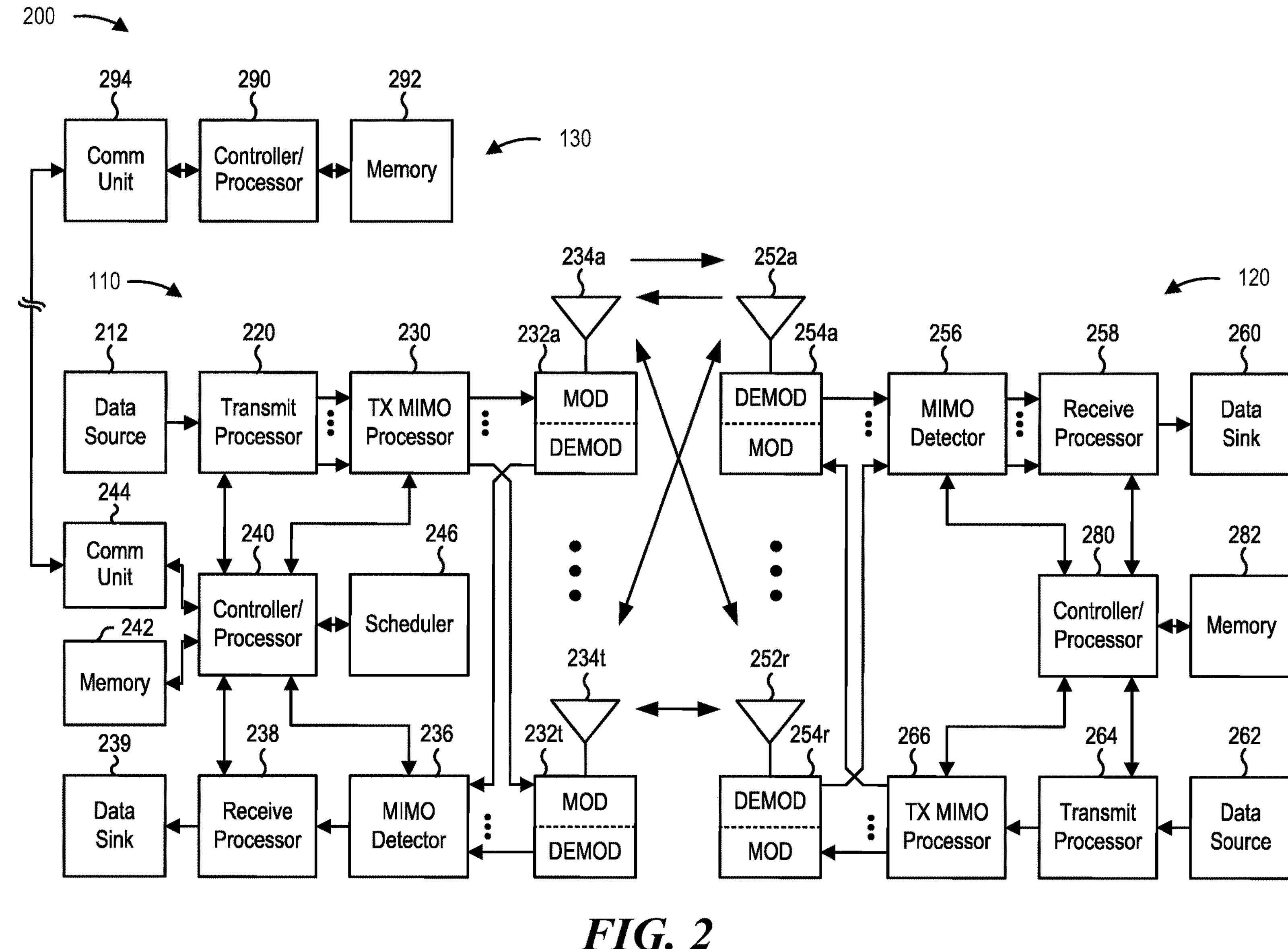
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with subscription switching for reception of positioning SIBs as described in more detail elsewhere. For example, the controller/processor 240 of the base station 110, the controller/processor 280 of the UE 120, and/or any other component(s) of FIG. 2 may perform or direct operations of, for example, the processes of FIGS. 7-12 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for selecting, means for receiving, means for switching, means for requesting, means for using, means for remaining, and means for predicting. Such means may include one or more components of the UE 120 described in connection with FIG. 2. Such means may include one or more components of the UE 120 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
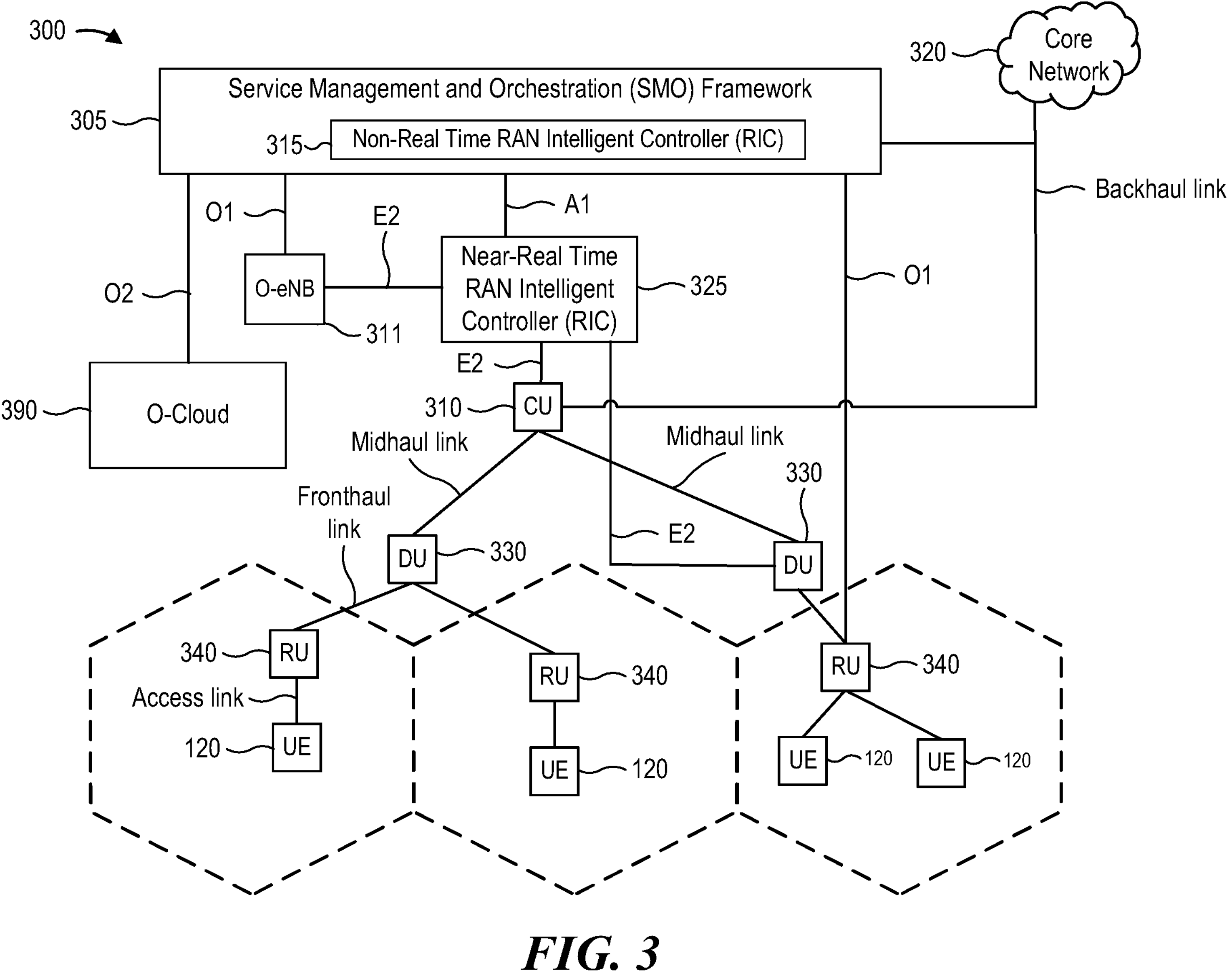
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

Third Generation Partnership Project (3GPP) Release 16 defines procedures for a user equipment (UE) to receive a positioning system information block (posSIB) from a new radio (NR) cell. The posSIB may enable very precise location determination using real-time kinematic positioning (RTK), for example. RTK can increase the accuracy of UE location determination from a few meters down to a few centimeters.

When a positioning session is ON, the UE continues to receive broadcast posSIBs for the duration of the session (for example, lasting several minutes to multiple hours) in order to receive updated global navigation satellite system (GNSS) assistance data. A minimum periodicity to receive a posSIB is once every T seconds. In some implementations, T ranges from 1 second to 30 seconds. In other implementations, T ranges from 80 ms to 5.12 seconds. The periodicity depends on which type of posSIB the UE is receiving, for example, and how many of the posSIBs the UE will receive.

The posSIB is sent in a broadcast channel. To allow the posSIB to be received only by eligible devices, the network ciphers the posSIB. For example, a UE may pay an extra fee to receive the posSIB and only the UEs paying the extra fee will receive the ciphering key. Thus, the UE needs to receive the ciphering key(s) from the network in order to decipher the posSIB and use its assistance data. The UE may use a registration request to request and receive a ciphering key(s) in a registration accept message.

Figure 4:
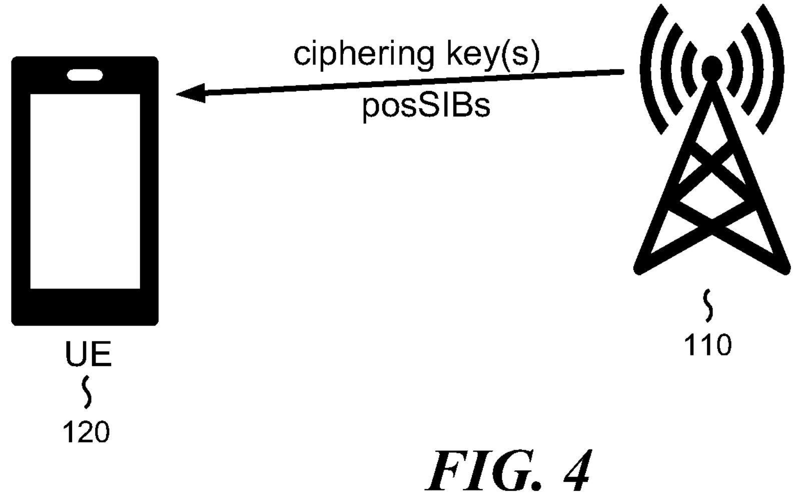
FIG. 4 is a diagram illustrating reception of a ciphering key and positioning system information broadcasts (posSIBs), in accordance with aspects of the present disclosure.

FIG. 4 is a diagram illustrating an example of receiving a ciphering key and positioning system information broadcasts (posSIBs), in accordance with aspects of the present disclosure. In the example of FIG. 4, a UE 120 receives one or more ciphering keys broadcast by a base station 110. Based on the ciphering key, the UE 120 is able to decipher the posSIBs received from the base station 110.

Figure 5:
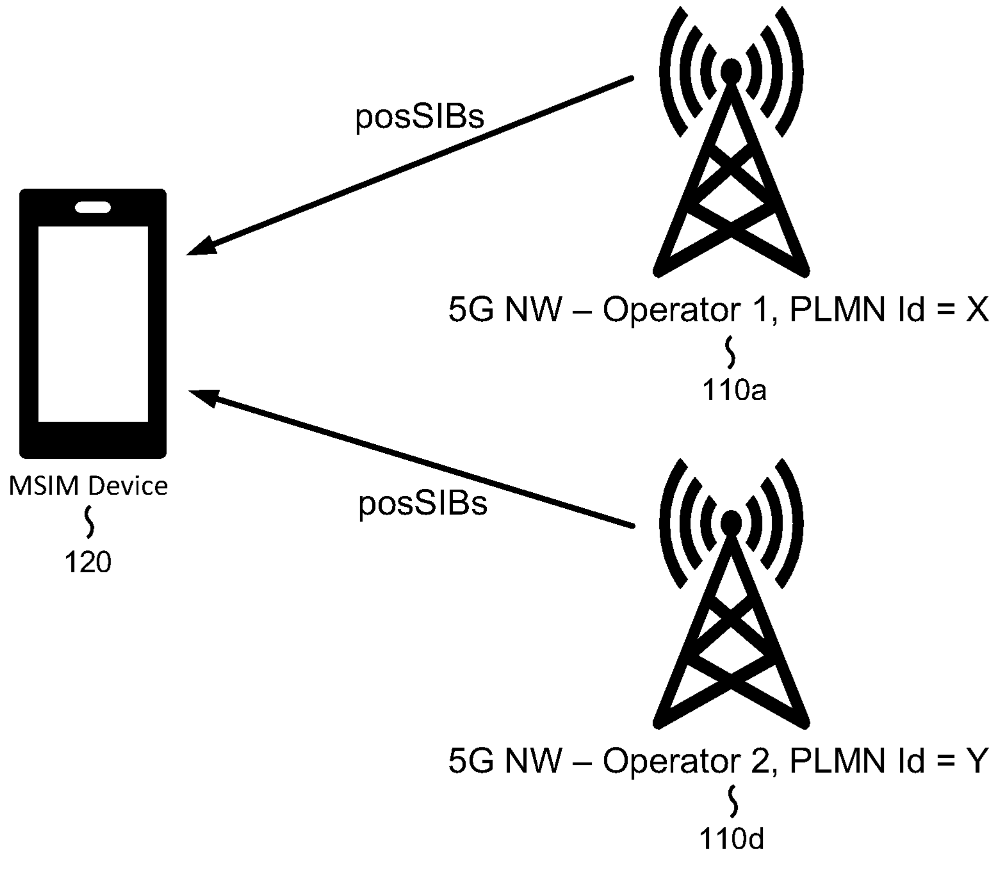
FIG. 5 is a diagram illustrating reception of posSIBs, by a multiple subscription user equipment (UE), in accordance with aspects of the present disclosure.

The UE may be a multi-SIM (subscriber identity module) device where there are two SIM cards or a single SIM device with multiple subscriptions. It is possible that both subscriptions (SUBs) are camped on or connected to the respective network that broadcasts posSIBs. FIG. 5 is a diagram illustrating reception of posSIBs, by a multiple subscription user equipment (UE), in accordance with aspects of the present disclosure. In the example of FIG. 5, a UE 120 is a multi-SIM device communicating to two base stations 110*a*, 110*d* in two different networks. Each base station 110*a*, 110*d* broadcasts posSIBs. The first network of the first base station 110*a* may be a 5G network with a public land mobile network (PLMN) identifier (ID) of X and a first operator (operator 1). The second network of the second base station 110*d* may be a 5G network with a public land mobile network (PLMN) identifier (ID) of Y and a second operator (operator 2). In the example of FIG. 5, both subscriptions are eligible to receive posSIBs. An issue for the UE 120 is which subscription should be selected to receive the posSIBs.

According to aspects of the present disclosure, the UE selects a subscription to reduce traffic interruption. FIG. 6 is a table illustrating selection rules for receiving posSIBs, in accordance with aspects of the present disclosure. In the example of FIG. 6, seven cases are considered. In each of the seven cases, the UE selects one of the subscriptions to receive posSIBs depending on a state of each subscription, such as what service is running and whether the subscription is in connected mode or idle/inactive mode.

For case one, the first subscription status is idle or inactive, and the second subscription status is idle or inactive. There is no service for either subscription due to the inactive/idle mode of both subscriptions. In case one, the UE selects the default data subscription (DDS) to receive the posSIBs. In some aspects, the UE continues with a same subscription, as described in more detail below. The UE selects the default data subscription because the default data subscription generally has more traffic. Thus, the UE can continue with the same subscription in connection mode without switching subscriptions.

For case two, the first subscription is in connected mode, and the second subscription status is inactive or idle. The first subscription uses voice or data service. The second subscription is inactive or idle and thus has no service. In case two, the UE selects the first subscription to receive the posSIBs. The UE uses the connected mode subscription to receive the posSIBs to avoid interruption of the subscription while switching to another subscription, and also to reduce power consumption.

For case three, the second subscription is in connected mode, and the first subscription status is inactive or idle. The second subscription uses voice or data service. The first subscription is inactive or idle and has no service. In case three, the UE selects the second subscription to receive the posSIBs. The UE uses the connected mode subscription to receive the posSIBs to avoid interruption of the subscription while switching to another subscription, and also to reduce power consumption.

For case four, the first subscription is in connected mode, and the second subscription status is in connected mode. The first subscription uses voice service. The second subscription uses data service. In case four, the UE selects the first subscription to receive the posSIBs. The UE uses the voice subscription to receive the posSIBs because the voice service has a higher priority than the data service.

For case five, the first subscription is in connected mode, and the second subscription status is in connected mode. The first subscription uses data service. The second subscription uses voice service. In case five, the UE selects the second subscription to receive the posSIBs. The UE uses the voice subscription to receive the posSIBs because the voice service has a higher priority than the data service. Thus, receiving the posSIB with the voice subscription is also treated with higher priority.

For case six, the first subscription is in connected mode, and the second subscription status is in connected mode. The first subscription uses voice service. The second subscription uses voice service. In case six, the UE selects the default data subscription to receive the posSIBs or continues with the same subscription, as described later. The UE uses the default data subscription to receive the posSIBs because of the higher priority of the default data subscription.

For case seven, the first subscription is in connected mode, and the second subscription status is in connected mode. The first subscription uses data service. The second subscription uses data service. In case seven, the UE selects the default data subscription to receive the posSIBs, or continues with the same subscription, as described later. The UE uses the default data subscription to receive the posSIBs because of the higher priority of the default data subscription.

Figure 7:
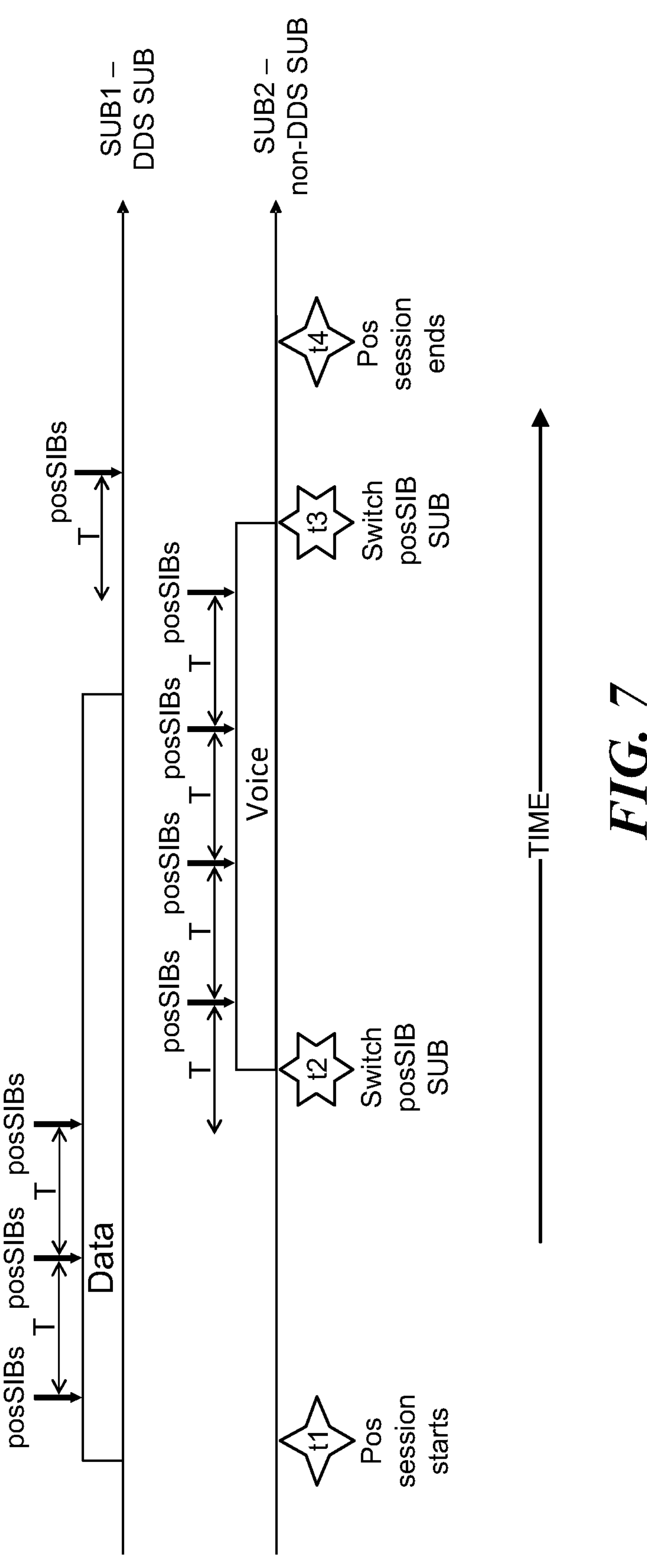
FIG. 7 is a timeline illustrating subscription switching for posSIB reception, based on a change of subscription state, in accordance with aspects of the present disclosure.

FIG. 7 is a timeline illustrating subscription switching for posSIB reception, based on a change of subscription state, in accordance with aspects of the present disclosure. In the example of FIG. 7, a first subscription (SUB1) is a default data subscription (DDS). A second subscription (SUB2) is a non-default data subscription. According to aspects illustrated in FIG. 7, the UE switches subscriptions when a UE state changes.

At time t1, a positioning session starts. The UE uses subscription 1 (SUB1), which is in connected mode for data service, to receive the posSIBs (case two). Every T seconds, the UE receives another posSIB. At time t2, the second subscription (SUB2) enters connected mode for voice traffic. When both subscriptions are in connected mode, the UE uses the second subscription (SUB2), that is, the voice subscription, to receive posSIBs (case five). The UE, therefore, switches posSIB reception from the first subscription (SUB1) to the second subscription (SUB2). At time t3, the second subscription (SUB2) releases its connection resulting in both subscriptions being idle or inactive. The UE, therefore, uses the first subscription (SUB1), that is, the DDS, to receive posSIBs (case one). Accordingly, the UE switches posSIB reception from the second subscription (SUB2) to the first subscription (SUB1). The positioning session ends at time t4.

Figure 8:
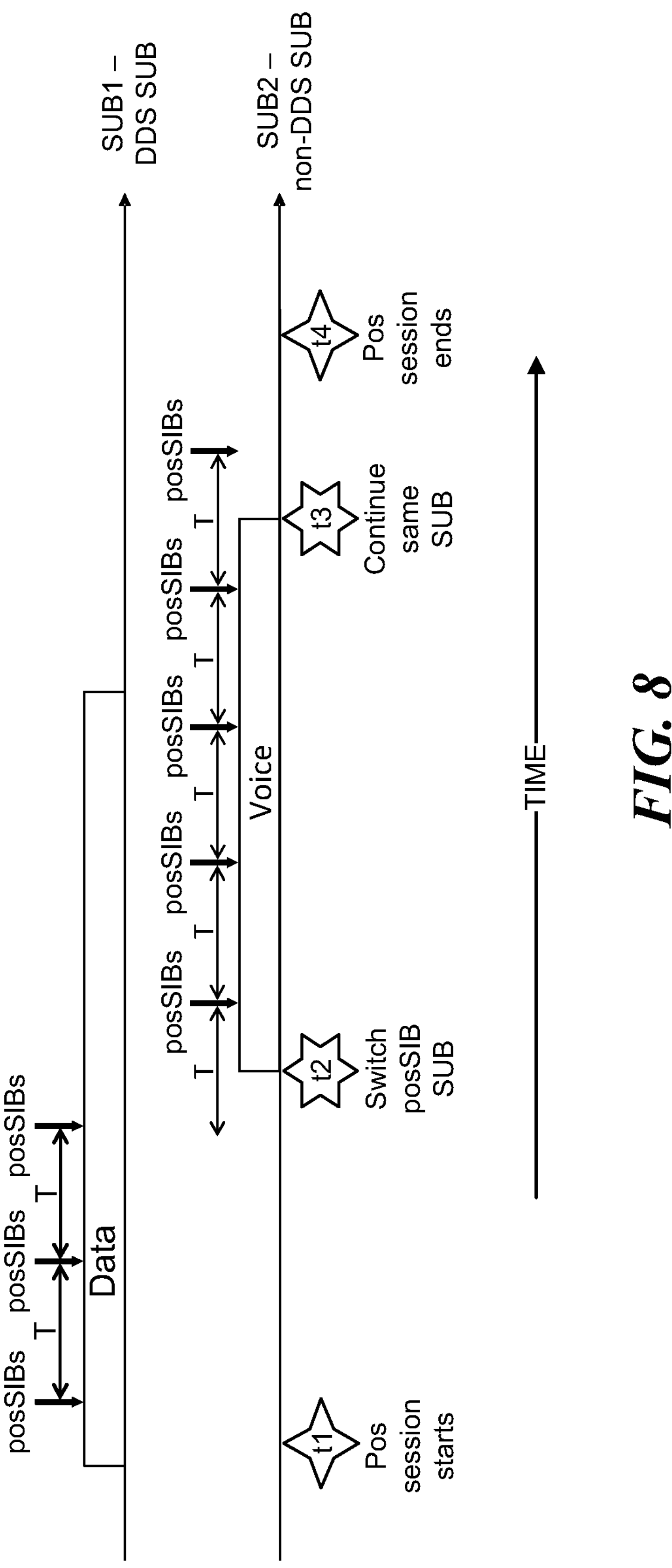
FIG. 8 is a timeline illustrating subscription switching with continuity, based on a change of subscription state, in accordance with aspects of the present disclosure.

In other aspects of the present disclosure, the UE switches subscription when the status changes, but maintains continuity. FIG. 8 is a timeline illustrating subscription switching with continuity, based on a change of subscription state, in accordance with aspects of the present disclosure. In the example of FIG. 8, a first subscription (SUB1) is a default data subscription (DDS). A second subscription (SUB2) is a non-default data subscription. According to aspects illustrated in FIG. 8, the UE continues with a current subscription to avoid switching, which may interrupt processing posSIBs received from different networks.

At time t1, a positioning session starts. The UE uses subscription 1 (SUB1), which is in connected mode for data service, to receive the posSIBs (case two). Every T seconds, the UE receives a posSIB. At time t2, the second subscription (SUB2) initiates connected mode for voice traffic. When both subscriptions are in connected mode, the UE uses the second subscription (SUB2), that is, the voice subscription, to receive posSIBs (case five). The UE, therefore, switches posSIB reception from the first subscription (SUB1) to the second subscription (SUB2). At time t3, the second subscription (SUB2) releases its connection resulting in both subscriptions being idle or inactive. When both subscriptions are idle or inactive, the UE continues to receive posSIBs (case one) with the current SUB, that is, the second subscription (SUB2). Switching back to the first subscription (SUB1) is avoided to prevent extra processing time for the switching process. The positioning session ends at time t4.

Figure 9:
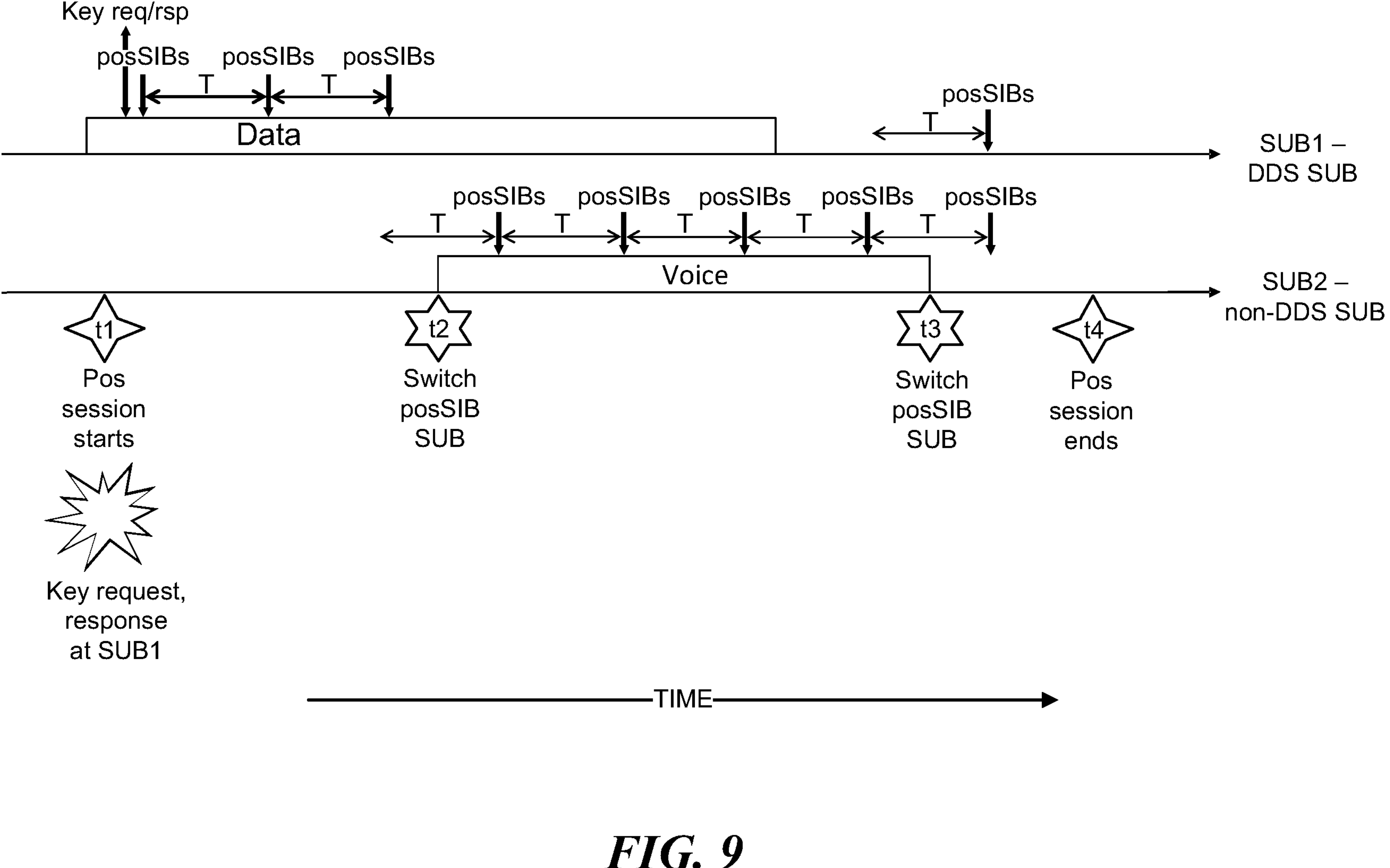
FIG. 9 is a timeline illustrating subscription switching for requesting a ciphering key, in accordance with aspects of the present disclosure.

According to aspects of the present disclosure, the UE selects the subscription receiving the posSIB in order to request a ciphering key. If two subscriptions belong to the same operator, either subscription can be used to request the ciphering key. FIG. 9 is a timeline illustrating subscription switching for requesting a ciphering key, in accordance with aspects of the present disclosure. In the example of FIG. 9, a first subscription (SUB1) is a default data subscription (DDS). A second subscription (SUB2) is a non-default data subscription. According to aspects illustrated in FIG. 9, the UE sticks to one subscription for the key request, for example, the initial subscription receiving the posSIBs. The UE, therefore, does not switch subscriptions for a key request, even though the subscription receiving the posSIBs has changed. In these aspects, the UE avoids frequent switching of subscriptions to request keys when the UE switches subscriptions for receiving posSIBs.

At time 11, a positioning session starts. The UE uses subscription 1 (SUB1), which is in connected mode for data service, to request the cipher key, to receive the key, and also to receive the posSIBs. Every T seconds, the UE receives a posSIB. At time t2, the second subscription (SUB2) enters connected mode for voice traffic. When both subscriptions are in connected mode, the UE uses the second subscription (SUB2), that is, the voice subscription, to receive posSIBs. The UE, therefore, switches posSIB reception from the first subscription (SUB1) to the second subscription (SUB2). In the example of FIG. 9, the UE continues to use the same cipher key after switching subscriptions. At time t3, the second subscription (SUB2) releases its connection resulting in both subscriptions being idle or inactive. The UE, therefore, returns to the first subscription (SUB1), that is, the DDS, to receive posSIBs, while also using the same cipher key requested at time t1. The positioning session ends at time t4.

Figure 10:
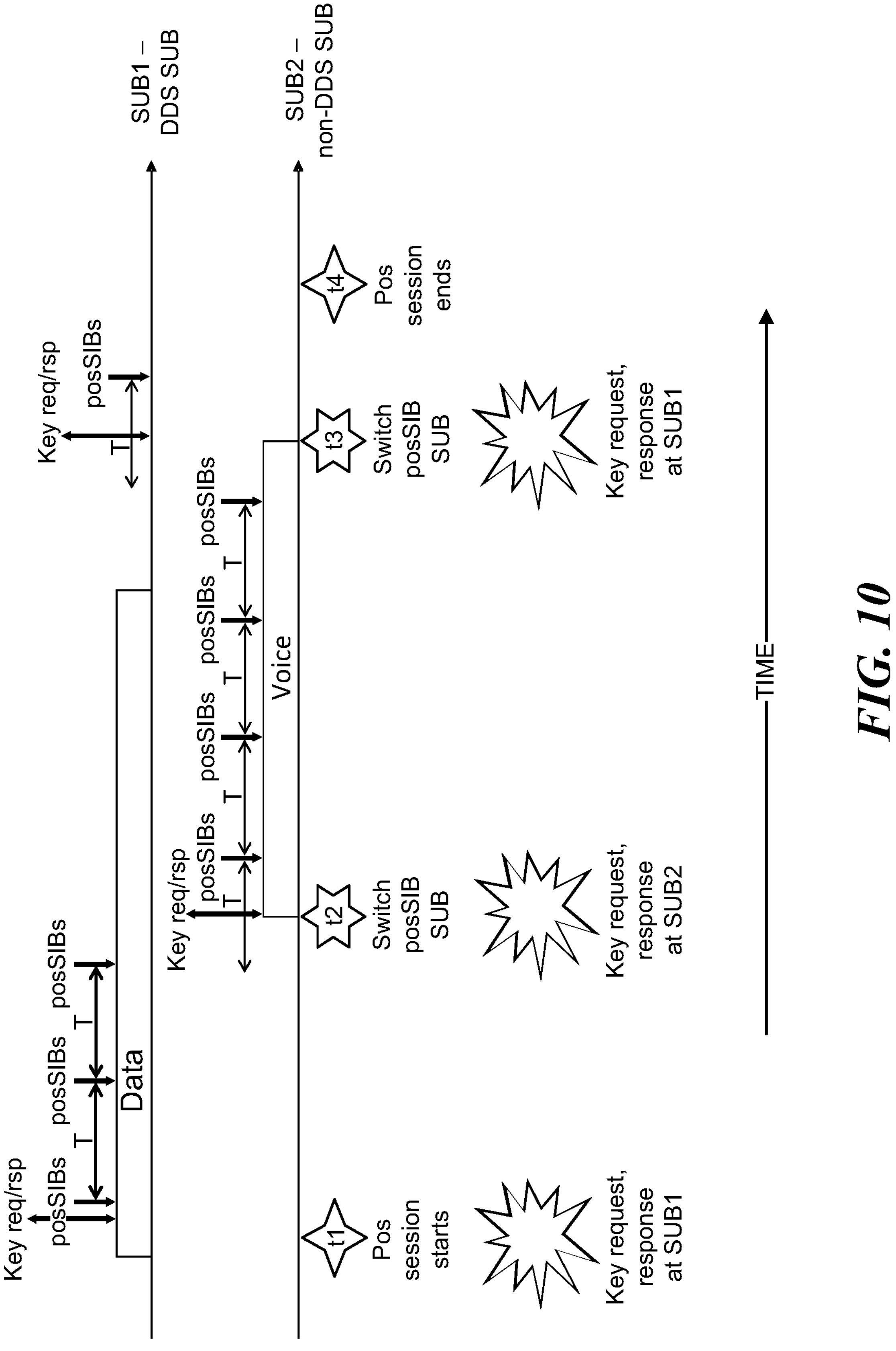
FIG. 10 is a timeline illustrating subscription switching for requesting a ciphering key, in accordance with alternative aspects of the present disclosure.

In other aspects, the UE selects the same subscription to both request the ciphering key and receive the posSIBs. FIG. 10 is a timeline illustrating subscription switching for requesting a ciphering key, in accordance with alternative aspects of the present disclosure. In the example of FIG. 10, a first subscription (SUB1) is a default data subscription (DDS). A second subscription (SUB2) is anon-default data subscription. According to aspects illustrated in FIG. 10, the UE always uses the same subscription to request the cipher key and receive the posSIB. At time t1, a positioning session starts. The UE uses subscription 1 (SUB1), which is in connected mode for data service, to request the cipher key, to receive the key, and also to receive the posSIBs. Every T seconds, the UE receives a posSIB. At time t2, the second subscription (SUB2) switches to connected mode for voice traffic. The UE uses the second subscription (SUB2) to request the cipher key, to receive the key, and also to receive the posSIBs. The UE uses the cipher key received at time t2, after switching subscriptions. At time t3, the second subscription (SUB2) releases its connection resulting in both subscriptions being idle or inactive. The UE, therefore, uses the first subscription (SUB1), that is, the DDS, to receive posSIBs. At time t3, the UE also uses the first subscription (SUB1) to request a cipher key and receive a response, if the cipher key received at time t1 has expired or if the area associated with the key requested at time t1 has changed. Otherwise, at time t3, the UE may use the key requested at time t1 (not shown). The positioning session ends at time t4.

According to further aspects of the present disclosure, the UE remains with an initial subscription for receiving posSIBs, even if the state changes. Each time a UE switches posSIBs, the location module at the UE resets the state, potentially disrupting the position service for a period of time. That is, once a subscription changes for receiving the posSIB, the location module resets and receives new assistance data to calculate a precise position. The location module should be stabilized in order to obtain a highly accurate position, which may take on the order of several hundreds of ms or even several seconds. According to these aspects, when a position session starts, the UE chooses a subscription using the rules shown in the table of FIG. 6. Afterwards, the UE remains with that subscription and does not change, although this may be a sub-optimal solution.

Figure 11:
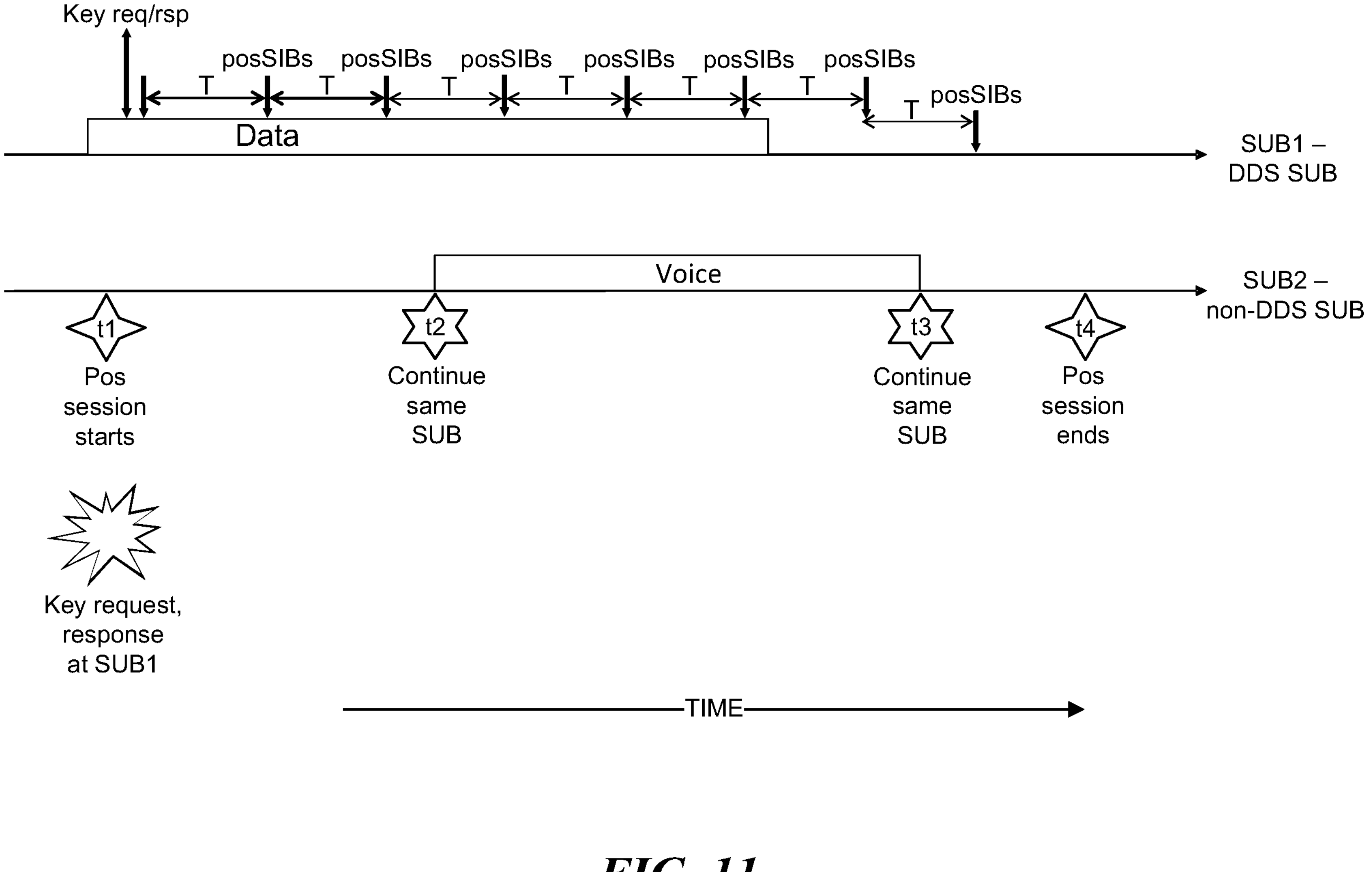
FIG. 11 is a timeline illustrating remaining with a subscription for posSIB reception, after a change of subscription state, in accordance with aspects of the present disclosure.

FIG. 11 is a timeline illustrating remaining with a subscription for posSIB reception, after a change of subscription state, in accordance with aspects of the present disclosure. In the example of FIG. 11, a first subscription (SUB1) is a default data subscription (DDS). A second subscription (SUB2) is a non-default data subscription. According to aspects illustrated in FIG. 11, the UE does not switch subscriptions when a UE state changes. The UE remains with the subscription that is active when the positioning session started. At time t1, a positioning session starts. The UE uses subscription 1 (SUB1), which is in connected mode for data service, to request a cipher key, to receive the cipher key, and to receive the posSIBs. Every T seconds, the UE receives a posSIB. At time t2, the second subscription (SUB2) enters connected mode for voice traffic. Even though both subscriptions are in connected mode, the UE remains with the first subscription (SUB1) to receive posSIBs. At time t3, the second subscription (SUB2) releases its connection resulting in both subscriptions being idle or inactive. The UE continues with the first subscription (SUB1) to receive posSIBs. The positioning session ends at time t4.

Aspects of the present disclosure are directed to selecting between switching subscriptions for posSIB reception and remaining with a subscription regardless of UE subscription state change. Switching subscriptions is beneficial for long lasting positioning sessions in which the device can have a state change triggering a posSIB reception subscription change. Remaining with a subscription is beneficial for short positioning sessions in which the device does not foresee a state change and, therefore, selects one subscription and stays with the subscription. The advantage of remaining with a subscription is that interruption to the positioning session is avoided. Remaining with a subscription may lose optimization of power consumption. Such a tradeoff may be an acceptable compromise for a short duration.

To remain with a subscription, aspects of the present disclosure determine if the duration of a positioning session is short (e.g., a few minutes) when the positioning session starts. The duration of the positioning session may be determined or predicted by a history and may also depend on the app triggering the positioning session. For example, the UE may monitor the past durations, D(1), D(2), . . . , D(n), with a filter (e.g., an infinite impulse response (IIR) filter). The UE can then predict the duration of the next positioning session based on the past durations. If the predicted duration of the next positioning session is small, for example, less than a threshold, the UE remains with the initial subscription. Otherwise, the UE switches subscriptions for receiving posSIBs in response to UE state changes.

The past durations can also be associated with the app that triggers the positioning session. For example, the durations Dj(1), Dj(2), . . . , Dj(nj) may be associated with the app j triggering the positioning session. If the UE detects that app j triggered a positioning session, the UE can predict the duration based on the prior durations associated with the app j.

Aspects of the present disclosure can allow a UE to select one of two subscriptions to receive posSIBs with improved performance in a multiple subscription UE. For example, traffic or position service disruption may be reduced in the multi-subscription UE. The techniques of the present disclosure may also reduce power consumption by using a connected mode subscription to receive posSIBs as opposed to receiving posSIBs during an idle or inactive subscription. Power saving is achieved because when an idle or inactive subscription is to receive posSIBs, the subscription can wake up more often and stay awake for longer each wakeup time due to reception of posSIBs.

As indicated above, FIGS. 4-11 are provided as examples. Other examples may differ from what is described with respect to FIGS. 4-11.

FIG. 12 is a flow diagram illustrating an example process 1200 performed, for example, by a user equipment (UE), in accordance with various aspects of the present disclosure. The example process 1200 is an example of selecting a subscription for receiving a positioning system information block (SIB) in a user equipment (UE) having multiple subscriptions, such as a multi-subscriber identity module (MSIM) UE. The operations of the process 1200 may be implemented by a UE 120.

At block 1202, the user equipment (UE) selects a first subscription to receive a positioning system information broadcast (posSIB) based on a first subscription state and a second subscription state. For example, the UE (e.g., using the controller/processor 280, memory 292, and/or the like) may select the first subscription. In some aspects, the second subscription state changing and/or the first subscription state changing comprises switching between idle/inactive mode and connected mode. In other aspects, the second subscription state changing and/or the first subscription state changing comprises switching between voice service and data service.

At block 1204, the user equipment (UE) receives the posSIB via the first subscription. For example, the UE (e.g., using the antenna 252, DEMOD/MOD 254, MIMO detector 256, receive processor 258, controller/processor 280, memory 292, and/or the like) may receive the posSIB. In some aspects, the UE may switch from the first subscription to a second subscription to receive a subsequent posSIB, in response to the second subscription state changing and/or the first subscription state changing. In some aspects, the UE may request a ciphering key for the posSIB via the first subscription in response to the first subscription belonging to a same network operator as a second subscription, and use the ciphering key after switching. In other aspects, the UE may request a subsequent ciphering key for the posSIB via the second subscription. In some aspects, the UE remains on the first subscription to receive a subsequent posSIB, in response to the second subscription state changing and/or the first subscription state changing. In other aspects, the UE predicting whether a duration of a positioning session is less than a threshold; and switches from the first subscription to a second subscription to receive a subsequent posSIB, in response to the second subscription state changing and/or the first subscription state changing, and also in response to the duration of the positioning session being greater than the threshold. Alternatively, the UE remains on the first subscription to receive the subsequent posSIB, in response to the second subscription state changing and/or the first subscription state changing, and also in response to the duration of the positioning session being less than the threshold.

Figure 13:
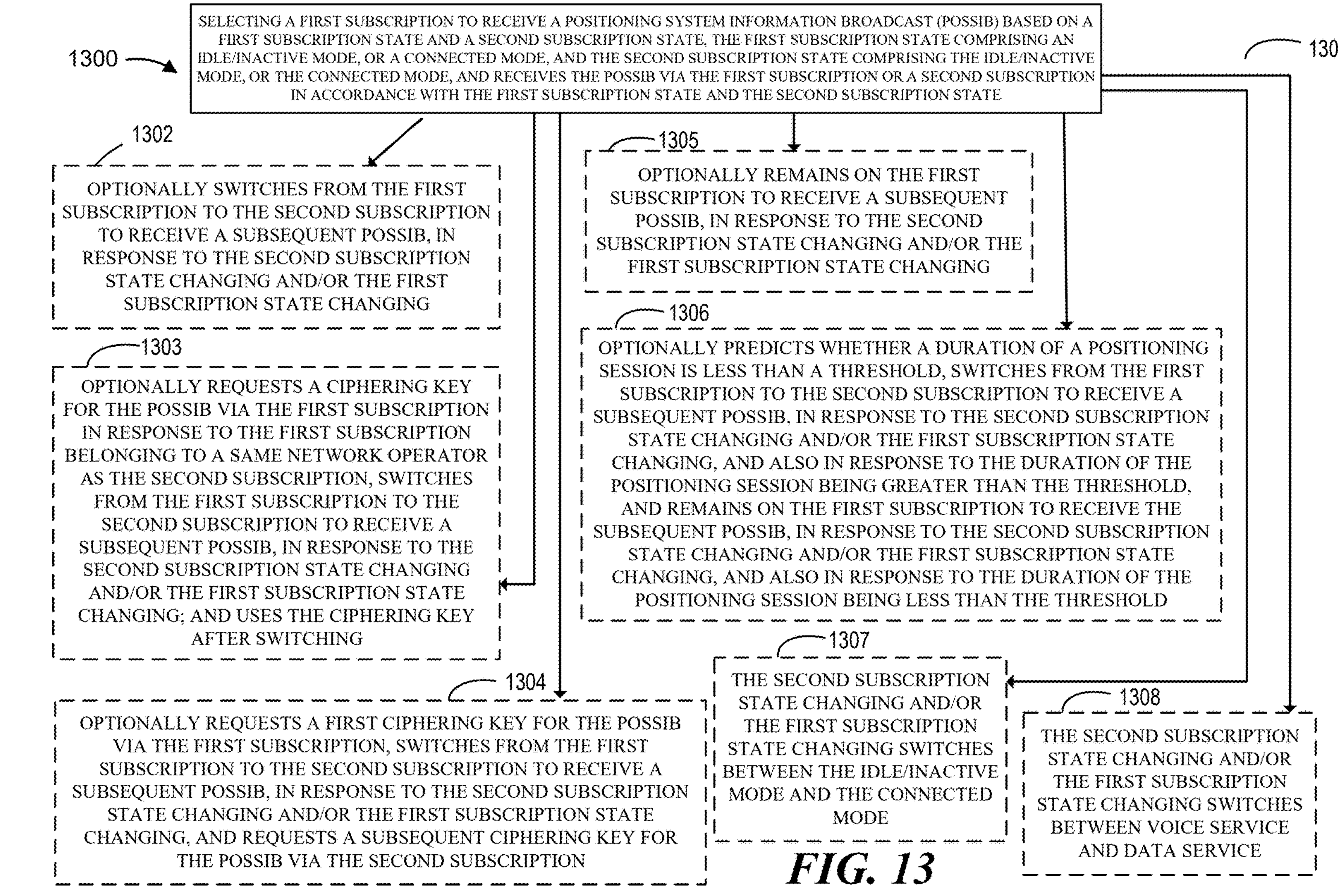
FIG. 13 is a flow diagram illustrating an example process performed, for example, by a user equipment (UE), in accordance with various aspects of the present disclosure.

FIG. 13 is a flow diagram illustrating an example process 1300 performed, for example, by a user equipment (UE), in accordance with various optional aspects of the present disclosure. The example process 1300 is an example of selecting a subscription for receiving a positioning system information block (SIB) in a user equipment (UE) having multiple subscriptions, such as a multi-subscriber identity module (MSIM) UE. The operations of the process 1300 may be implemented by a UE 120. At block 1301, the UE selects a first subscription to receive a positioning system information broadcast (posSIB) based on a first subscription state and a second subscription state, the first subscription state comprising an idle/inactive mode, or a connected mode, and the second subscription state comprising the idle/inactive mode, or the connected mode; and optionally receives the posSIB via the first subscription or a second subscription in accordance with the first subscription state and the second subscription state. At block 1302, the UE optionally switches from the first subscription to the second subscription to receive a subsequent posSIB, in response to the second subscription state changing and/or the first subscription state changing. At block 1303, the UE optionally requests a ciphering key for the posSIB via the first subscription in response to the first subscription belonging to a same network operator as the second subscription, switches from the first subscription to the second subscription to receive a subsequent posSIB, in response to the second subscription state changing and/or the first subscription state changing; and uses the ciphering key after switching. At block 1304, the UE optionally requests a first ciphering key for the posSIB via the first subscription, switches from the first subscription to the second subscription to receive a subsequent posSIB, in response to the second subscription state changing and/or the first subscription state changing, and requests a subsequent ciphering key for the posSIB via the second subscription. At block 1305, the UE optionally remains on the first subscription to receive a subsequent posSIB, in response to the second subscription state changing and/or the first subscription state changing. At block 1306, the UE optionally predicts whether a duration of a positioning session is less than a threshold, switches from the first subscription to the second subscription to receive a subsequent posSIB, in response to the second subscription state changing and/or the first subscription state changing, and also in response to the duration of the positioning session being greater than the threshold, and remains on the first subscription to receive the subsequent posSIB, in response to the second subscription state changing and/or the first subscription state changing, and also in response to the duration of the positioning session being less than the threshold. At block 1307, the second subscription state changing and/or the first subscription state changing switches between the idle/inactive mode and the connected mode. Alternatively, at block 1308, the second subscription state changing and/or the first subscription state changing switches between voice service and data service.

EXAMPLE ASPECTS

Aspect 1: A method of wireless communication, by a multi-subscription user equipment (UE), comprising: selecting a first subscription to receive a positioning system information broadcast (posSIB) based on a first subscription state and a second subscription state; and receiving the posSIB via the first subscription.

Aspect 2: The method of Aspect 1, further comprising switching from the first subscription to a second subscription to receive a subsequent posSIB, in response to the second subscription state changing and/or the first subscription state changing.

Aspect 3: The method of Aspect 1 or 2, further comprising: requesting a ciphering key for the posSIB via the first subscription in response to the first subscription belonging to a same network operator as a second subscription; switching from the first subscription to the second subscription to receive a subsequent posSIB, in response to the second subscription state changing and/or the first subscription state changing; and using the ciphering key after switching.

Aspect 4: The method of Aspect 1 or 2, further comprising: requesting a first ciphering key for the posSIB via the first subscription; switching from the first subscription to a second subscription to receive a subsequent posSIB, in response to the second subscription state changing and/or the first subscription state changing; and requesting a subsequent ciphering key for the posSIB via the second subscription.

Aspect 5: The method of any of the previous Aspects, further comprising remaining on the first subscription to receive a subsequent posSIB, in response to the second subscription state changing and/or the first subscription state changing.

Aspect 6: The method of any of the previous Aspects, further comprising: predicting whether a duration of a positioning session is less than a threshold; switching from the first subscription to a second subscription to receive a subsequent posSIB, in response to the second subscription state changing and/or the first subscription state changing, and also in response to the duration of the positioning session being greater than the threshold; or remaining on the first subscription to receive the subsequent posSIB, in response to the second subscription state changing and/or the first subscription state changing, and also in response to the duration of the positioning session being less than the threshold.

Aspect 7: The method of any of the previous Aspects, in which the second subscription state changing and/or the first subscription state changing comprises switching between idle/inactive mode and connected mode.

Aspect 8: The method of any of the previous Aspects, in which the second subscription state changing and/or the first subscription state changing comprises switching between voice service and data service.

Aspect 9: An apparatus for of wireless communication, by a multi-subscription user equipment (UE), comprising: a memory; and at least one processor coupled to the memory, the at least one processor configured: to select a first subscription to receive a positioning system information broadcast (posSIB) based on a first subscription state and a second subscription state; and to receive the posSIB via the first subscription.

Aspect 10: The apparatus of Aspect 9, in which the at least one processor is further configured to switch from the first subscription to a second subscription to receive a subsequent posSIB, in response to the second subscription state changing and/or the first subscription state changing.

Aspect 11: The apparatus of Aspect 9 or 10, in which the at least one processor is further configured: to request a ciphering key for the posSIB via the first subscription in response to the first subscription belonging to a same network operator as a second subscription; to switch from the first subscription to the second subscription to receive a subsequent posSIB, in response to the second subscription state changing and/or the first subscription state changing; and to use the ciphering key after switching.

Aspect 12: The apparatus of Aspect 9 or 10, in which the at least one processor is further configured: to request a first ciphering key for the posSIB via the first subscription; to switch from the first subscription to a second subscription to receive a subsequent posSIB, in response to the second subscription state changing and/or the first subscription state changing; and to request a subsequent ciphering key for the posSIB via the second subscription.

Aspect 13: The apparatus of any of the Aspects 9-12, in which the at least one processor is further configured to remain on the first subscription to receive a subsequent posSIB, in response to the second subscription state changing and/or the first subscription state changing.

Aspect 14: The apparatus of any of the Aspects 9-13, in which the at least one processor is further configured: to predict whether a duration of a positioning session is less than a threshold; to switch from the first subscription to a second subscription to receive a subsequent posSIB, in response to the second subscription state changing and/or the first subscription state changing, and also in response to the duration of the positioning session being greater than the threshold; or to remain on the first subscription to receive the subsequent posSIB, in response to the second subscription state changing and/or the first subscription state changing, and also in response to the duration of the positioning session being less than the threshold.

Aspect 15: The apparatus of any of the Aspects 9-14, in which the second subscription state changing and/or the first subscription state changing comprises switching between idle/inactive mode and connected mode.

Aspect 16: The apparatus of any of the Aspects 9-15, in which the second subscription state changing and/or the first subscription state changing comprises switching between voice service and data service.

Aspect 17: An apparatus for of wireless communication, by a multi-subscription user equipment (UE), comprising: means for selecting a first subscription to receive a positioning system information broadcast (posSIB) based on a first subscription state and a second subscription state; and means for receiving the posSIB via the first subscription.

Aspect 18: The apparatus of Aspect 17, further comprising means for switching from the first subscription to a second subscription to receive a subsequent posSIB, in response to the second subscription state changing and/or the first subscription state changing.

Aspect 19: The apparatus of Aspect 17 or 18, further comprising: means for requesting a ciphering key for the posSIB via the first subscription in response to the first subscription belonging to a same network operator as a second subscription; means for switching from the first subscription to the second subscription to receive a subsequent posSIB, in response to the second subscription state changing and/or the first subscription state changing; and means for using the ciphering key after switching.

Aspect 20: The apparatus of Aspect 17 or 18, further comprising: means for requesting a first ciphering key for the posSIB via the first subscription; means for switching from the first subscription to a second subscription to receive a subsequent posSIB, in response to the second subscription state changing and/or the first subscription state changing; and means for requesting a subsequent ciphering key for the posSIB via the second subscription.

Aspect 21: The apparatus of any of the Aspects 17-20, further comprising means for remaining on the first subscription to receive a subsequent posSIB, in response to the second subscription state changing and/or the first subscription state changing.

Aspect 22: The apparatus of any of the Aspects 17-21, further comprising: means for predicting whether a duration of a positioning session is less than a threshold; means for switching from the first subscription to a second subscription to receive a subsequent posSIB, in response to the second subscription state changing and/or the first subscription state changing, and also in response to the duration of the positioning session being greater than the threshold; or means for remaining on the first subscription to receive the subsequent posSIB, in response to the second subscription state changing and/or the first subscription state changing, and also in response to the duration of the positioning session being less than the threshold.

Aspect 23: The apparatus of any of the Aspects 17-22, in which the second subscription state changing and/or the first subscription state changing comprises switching between idle/inactive mode and connected mode.

Aspect 24: The apparatus of any of the Aspects 17-23, in which the second subscription state changing and/or the first subscription state changing comprises switching between voice service and data service.

Aspect 25: A non-transitory computer-readable medium having program code recorded thereon, the program code executed by a processor and comprising: program code to select a first subscription to receive a positioning system information broadcast (posSIB) based on a first subscription state and a second subscription state; and program code to receive the posSIB via the first subscription.

Aspect 26: The non-transitory computer-readable medium of Aspect 25, in which the program code further comprises program code to switch from the first subscription to a second subscription to receive a subsequent posSIB, in response to the second subscription state changing and/or the first subscription state changing.

Aspect 27: The non-transitory computer-readable medium of Aspect 25 or 26, in which the program code further comprises: program code to request a ciphering key for the posSIB via the first subscription in response to the first subscription belonging to a same network operator as a second subscription; program code to switch from the first subscription to the second subscription to receive a subsequent posSIB, in response to the second subscription state changing and/or the first subscription state changing; and program code to use the ciphering key after switching.

Aspect 28: The non-transitory computer-readable medium of Aspect 25 or 26, in which the program code further comprises: program code to request a first ciphering key for the posSIB via the first subscription; program code to switch from the first subscription to a second subscription to receive a subsequent posSIB, in response to the second subscription state changing and/or the first subscription state changing; and program code to request a subsequent ciphering key for the posSIB via the second subscription.

Aspect 29: The non-transitory computer-readable medium of any of the Aspects 25-28, in which the program code further comprises program code to remain on the first subscription to receive a subsequent posSIB, in response to the second subscription state changing and/or the first subscription state changing.

Aspect 30: The non-transitory computer-readable medium of any of the Aspects 25-29, in which the program code further comprises: program code to predict whether a duration of a positioning session is less than a threshold; program code to switch from the first subscription to a second subscription to receive a subsequent posSIB, in response to the second subscription state changing and/or the first subscription state changing, and also in response to the duration of the positioning session being greater than the threshold; or program code to remain on the first subscription to receive the subsequent posSIB, in response to the second subscription state changing and/or the first subscription state changing, and also in response to the duration of the positioning session being less than the threshold.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a multi-subscription user equipment (UE), comprising:

prioritizing a first subscription over a second subscription based on a first subscription state and a first service type in connected mode of the first subscription and a second subscription state and a second service type in the connected mode of the second subscription to save power when receiving a positioning system information block (posSIB);

selecting the first subscription to receive the posSIB in accordance with the prioritizing, the first subscription state comprising an idle/inactive mode, or a connected mode, and the second subscription state comprising the idle/inactive mode, or the connected mode; and receiving the posSIB via the first subscription.

2. The method of claim 1, further comprising switching from the first subscription to the second subscription to receive a subsequent posSIB, in response to the second subscription state changing and/or the first subscription state changing.

3. The method of claim 1, further comprising:

requesting a ciphering key for the posSIB via the first subscription in response to the first subscription belonging to a same network operator as the second subscription;

switching from the first subscription to the second subscription to receive a subsequent posSIB, in response to the second subscription state changing and/or the first subscription state changing; and using the ciphering key after switching.

4. The method of claim 1, further comprising:

requesting a first ciphering key for the posSIB via the first subscription;

switching from the first subscription to the second subscription to receive a subsequent posSIB, in response to the second subscription state changing and/or the first subscription state changing; and requesting a subsequent ciphering key for the posSIB via the second subscription.

5. The method of claim 1, further comprising remaining on the first subscription to receive a subsequent posSIB, in response to the second subscription state changing and/or the first subscription state changing.

6. The method of claim 1, further comprising:

predicting whether a duration of a positioning session is less than a threshold;

switching from the first subscription to the second subscription to receive a subsequent posSIB, in response to the second subscription state changing and/or the first subscription state changing, and also in response to the duration of the positioning session being greater than the threshold; or remaining on the first subscription to receive the subsequent posSIB, in response to the second subscription state changing and/or the first subscription state changing, and also in response to the duration of the positioning session being less than the threshold.

7. The method of claim 1, in which the second subscription state changing and/or the first subscription state changing comprises switching between the idle/inactive mode and the connected mode.

8. The method of claim 1, in which the second subscription state changing and/or the first subscription state changing comprises switching between voice service and data service.

9. An apparatus for of wireless communication, by a multi-subscription user equipment (UE), comprising:

a memory;

a transceiver; and at least one processor coupled to the memory, the at least one processor and transceiver configured:

to prioritize a first subscription over a second subscription based on a first subscription state and a first service type in connected mode of the first subscription and a second subscription state and a second service type in the connected mode of the second subscription to save power when receiving a positioning system information block (posSIB);

to select the first subscription to receive the posSIB in accordance with prioritizing, the first subscription state comprising an idle/inactive mode, or a connected mode, and the second subscription state comprising the idle/inactive mode, or the connected mode; and to receive the posSIB via the first subscription.

10. The apparatus of claim 9, in which the at least one processor is further configured to switch from the first subscription to the second subscription to receive a subsequent posSIB, in response to the second subscription state changing and/or the first subscription state changing.

11. The apparatus of claim 9, in which the at least one processor is further configured:

to request a ciphering key for the posSIB via the first subscription in response to the first subscription belonging to a same network operator as the second subscription;

to switch from the first subscription to the second subscription to receive a subsequent posSIB, in response to the second subscription state changing and/or the first subscription state changing; and to use the ciphering key after switching.

12. The apparatus of claim 9, in which the at least one processor is further configured:

to request a first ciphering key for the posSIB via the first subscription;

to switch from the first subscription to the second subscription to receive a subsequent posSIB, in response to the second subscription state changing and/or the first subscription state changing; and to request a subsequent ciphering key for the posSIB via the second subscription.

13. The apparatus of claim 9, in which the at least one processor is further configured to remain on the first subscription to receive a subsequent posSIB, in response to the second subscription state changing and/or the first subscription state changing.

14. The apparatus of claim 9, in which the at least one processor is further configured:

to predict whether a duration of a positioning session is less than a threshold;

to switch from the first subscription to the second subscription to receive a subsequent posSIB, in response to the second subscription state changing and/or the first subscription state changing, and also in response to the duration of the positioning session being greater than the threshold; or to remain on the first subscription to receive the subsequent posSIB, in response to the second subscription state changing and/or the first subscription state changing, and also in response to the duration of the positioning session being less than the threshold.

15. The apparatus of claim 9, in which the second subscription state changing and/or the first subscription state changing comprises switching between the idle/inactive mode and the connected mode.

16. The apparatus of claim 9, in which the second subscription state changing and/or the first subscription state changing comprises switching between voice service and data service.

17. An apparatus for of wireless communication, by a multi-subscription user equipment (UE), comprising:

means for prioritizing a first subscription over a second subscription based on a first subscription state and a first service type in connected mode of the first subscription and a second subscription state and a second service type in the connected mode of the second subscription to save power when receiving a positioning system information block (posSIB);

means for selecting the first subscription to receive the posSIB in accordance with the prioritizing, the first subscription state comprising an idle/inactive mode, or a connected mode, and the second subscription state comprising the idle/inactive mode, or the connected mode; and means for receiving the posSIB via the first subscription.

18. The apparatus of claim 17, further comprising means for switching from the first subscription to the second subscription to receive a subsequent posSIB, in response to the second subscription state changing and/or the first subscription state changing.

19. The apparatus of claim 17, further comprising:

means for requesting a ciphering key for the posSIB via the first subscription in response to the first subscription belonging to a same network operator as the second subscription;

means for switching from the first subscription to the second subscription to receive a subsequent posSIB, in response to the second subscription state changing and/or the first subscription state changing; and means for using the ciphering key after switching.

20. The apparatus of claim 17, further comprising:

means for requesting a first ciphering key for the posSIB via the first subscription;

means for switching from the first subscription to the second subscription to receive a subsequent posSIB, in response to the second subscription state changing and/or the first subscription state changing; and means for requesting a subsequent ciphering key for the posSIB via the second subscription.

21. The apparatus of claim 17, further comprising means for remaining on the first subscription to receive a subsequent posSIB, in response to the second subscription state changing and/or the first subscription state changing.

22. The apparatus of claim 17, further comprising:

means for predicting whether a duration of a positioning session is less than a threshold;

means for switching from the first subscription to the second subscription to receive a subsequent posSIB, in response to the second subscription state changing and/or the first subscription state changing, and also in response to the duration of the positioning session being greater than the threshold; or means for remaining on the first subscription to receive the subsequent posSIB, in response to the second subscription state changing and/or the first subscription state changing, and also in response to the duration of the positioning session being less than the threshold.

23. The apparatus of claim 17, in which the second subscription state changing and/or the first subscription state changing comprises switching between the idle/inactive mode and the connected mode.

24. The apparatus of claim 17, in which the second subscription state changing and/or the first subscription state changing comprises switching between voice service and data service.

25. A non-transitory computer-readable medium having program code recorded thereon, the program code executed by a processor and comprising:

program code to prioritize a first subscription over a second subscription based on a first subscription state and a first service type in connected mode of the first subscription and a second subscription state and a second service type in the connected mode of the second subscription to save power when receiving a positioning system information block (posSIB);

program code to select the first subscription to receive the posSIB in accordance with prioritizing, the first subscription state comprising an idle/inactive mode, or a connected mode, and the second subscription state comprising the idle/inactive mode, or the connected mode; and program code to receive the posSIB via the first subscription.

26. The non-transitory computer-readable medium of claim 25, in which the program code further comprises program code to switch from the first subscription to the second subscription to receive a subsequent posSIB, in response to the second subscription state changing and/or the first subscription state changing.

27. The non-transitory computer-readable medium of claim 25, in which the program code further comprises:

program code to request a ciphering key for the posSIB via the first subscription in response to the first subscription belonging to a same network operator as the second subscription;

program code to switch from the first subscription to the second subscription to receive a subsequent posSIB, in response to the second subscription state changing and/or the first subscription state changing; and program code to use the ciphering key after switching.

28. The non-transitory computer-readable medium of claim 25, in which the program code further comprises:

program code to request a first ciphering key for the posSIB via the first subscription;

program code to switch from the first subscription to the second subscription to receive a subsequent posSIB, in response to the second subscription state changing and/or the first subscription state changing; and program code to request a subsequent ciphering key for the posSIB via the second subscription.

29. The non-transitory computer-readable medium of claim 25, in which the program code further comprises program code to remain on the first subscription to receive a subsequent posSIB, in response to the second subscription state changing and/or the first subscription state changing.

30. The non-transitory computer-readable medium of claim 25, in which the program code further comprises:

program code to predict whether a duration of a positioning session is less than a threshold;

program code to switch from the first subscription to the second subscription to receive a subsequent posSIB, in response to the second subscription state changing and/or the first subscription state changing, and also in response to the duration of the positioning session being greater than the threshold; or program code to remain on the first subscription to receive the subsequent posSIB, in response to the second subscription state changing and/or the first subscription state changing, and also in response to the duration of the positioning session being less than the threshold.

* * * * *